United States Patent
Shin et al.

(10) Patent No.: US 9,634,880 B2
(45) Date of Patent: Apr. 25, 2017

(54) METHOD FOR DISPLAYING USER INTERFACE AND DISPLAY DEVICE THEREOF

(71) Applicant: LG ELECTRONICS INC., Seoul (KR)

(72) Inventors: Yonghwan Shin, Seoul (KR); Hyun Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 334 days.

(21) Appl. No.: 13/650,648

(22) Filed: Oct. 12, 2012

(65) Prior Publication Data

US 2013/0138726 A1 May 30, 2013

Related U.S. Application Data

(60) Provisional application No. 61/563,602, filed on Nov. 24, 2011, provisional application No. 61/563,607, filed on Nov. 25, 2011.

(51) Int. Cl.
  *G06F 15/16* (2006.01)
  *H04L 29/08* (2006.01)
  (Continued)

(52) U.S. Cl.
  CPC .............. *H04L 29/08* (2013.01); *G08C 17/00* (2013.01); *H04L 67/025* (2013.01);
  (Continued)

(58) Field of Classification Search
  CPC ....... H04L 67/10; H04L 67/14; H04L 67/125; H04L 29/08; G06F 3/033; G06F 3/038;
  (Continued)

(56) References Cited

U.S. PATENT DOCUMENTS

2002/0149617 A1 * 10/2002 Becker .................. G06F 3/1454
                                                                         715/751
2005/0007344 A1 * 1/2005 Cook et al. ................... 345/163
(Continued)

FOREIGN PATENT DOCUMENTS

CN        101467453        6/2009
CN        101507179        8/2009
(Continued)

OTHER PUBLICATIONS

International Search Report dated Jan. 22, 2013.
(Continued)

*Primary Examiner* — Brian J Gillis
*Assistant Examiner* — Austin Moreau
(74) *Attorney, Agent, or Firm* — Ked & Associates, LLP

(57) ABSTRACT

Provided is a method for displaying a graphical user interface on a server device and a client device for controlling the server device. The method may include receiving AV data being played in the server device at the client device, receiving a command at the client device to control the server device, generating a first graphical user interface in response to the received command for display on the client device together with the AV data received from the server device, transmitting a control signal corresponding to the command to the server device, and receiving information related to a second graphical user interface displayed on the server device in response to the command. The first graphical user interface may be displayed on the client device before the information related to the second graphical user interface displayed on the server device is received.

15 Claims, 6 Drawing Sheets

(51) Int. Cl.
*H04N 5/44* (2011.01)
*H04N 21/422* (2011.01)
*H04N 21/47* (2011.01)
*H04N 21/643* (2011.01)
*G08C 17/00* (2006.01)
*G06F 3/048* (2013.01)

(52) U.S. Cl.
CPC ....... *H04N 5/4403* (2013.01); *H04N 21/4222* (2013.01); *H04N 21/47* (2013.01); *H04N 21/64322* (2013.01); *G06F 3/048* (2013.01); *G08C 2201/41* (2013.01); *H04N 2005/4425* (2013.01)

(58) Field of Classification Search
CPC ... G06F 3/1454; G06F 3/1462; G06F 3/04812
USPC ........................................................ 709/227
See application file for complete search history.

(56) References Cited

U.S. PATENT DOCUMENTS

| | | | |
|---|---|---|---|
| 2006/0075106 A1* | 4/2006 | Hochmuth et al. | 709/227 |
| 2007/0288640 A1* | 12/2007 | Schmieder | 709/227 |
| 2008/0243998 A1 | 10/2008 | Oh et al. | |
| 2008/0244461 A1* | 10/2008 | Kropivny | H04L 12/1827 715/856 |
| 2008/0282003 A1* | 11/2008 | Holovacs et al. | 710/72 |
| 2010/0235428 A1 | 9/2010 | Kikkawa | |
| 2011/0072399 A1 | 3/2011 | Kim et al. | |
| 2011/0242268 A1 | 10/2011 | Kim et al. | |
| 2011/0267291 A1 | 11/2011 | Choi et al. | |

FOREIGN PATENT DOCUMENTS

| | | |
|---|---|---|
| CN | 102099774 | 6/2011 |
| JP | 2010501928 A | 1/2010 |
| JP | 2011528146 A | 11/2011 |
| KR | 10-2008-0074384 A | 8/2008 |
| KR | 10-2011-0032596 A | 3/2011 |

OTHER PUBLICATIONS

European Search Report issued in Application No. 12851947.7 dated Jun. 25, 2015.

Chinese Office Action dated Dec. 2, 2016 issued in Application No. 201280057621.2 (English translation with Chinese Search Report).

* cited by examiner

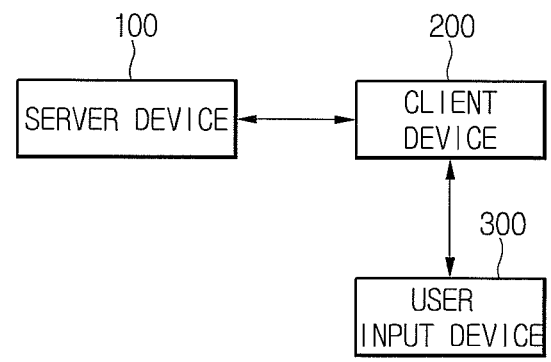
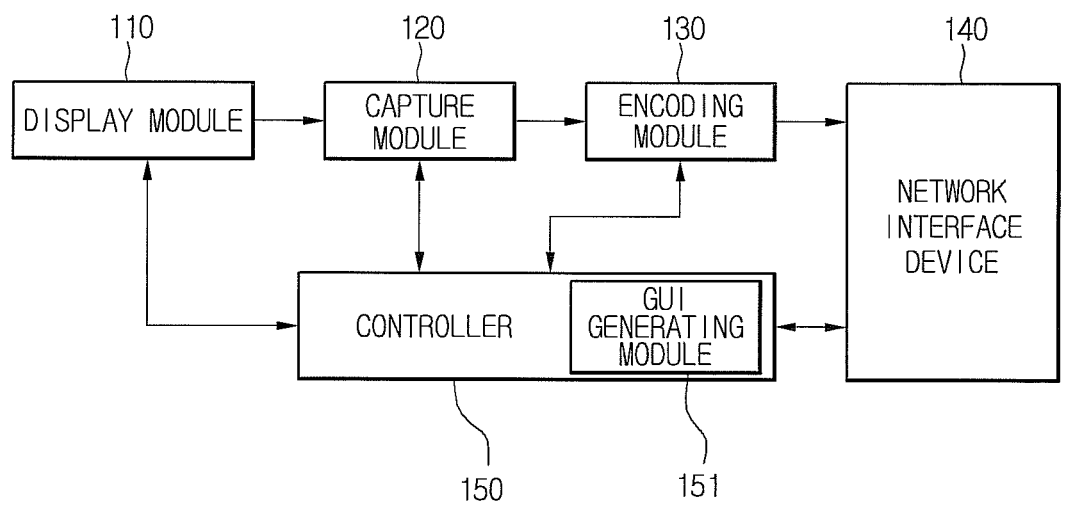

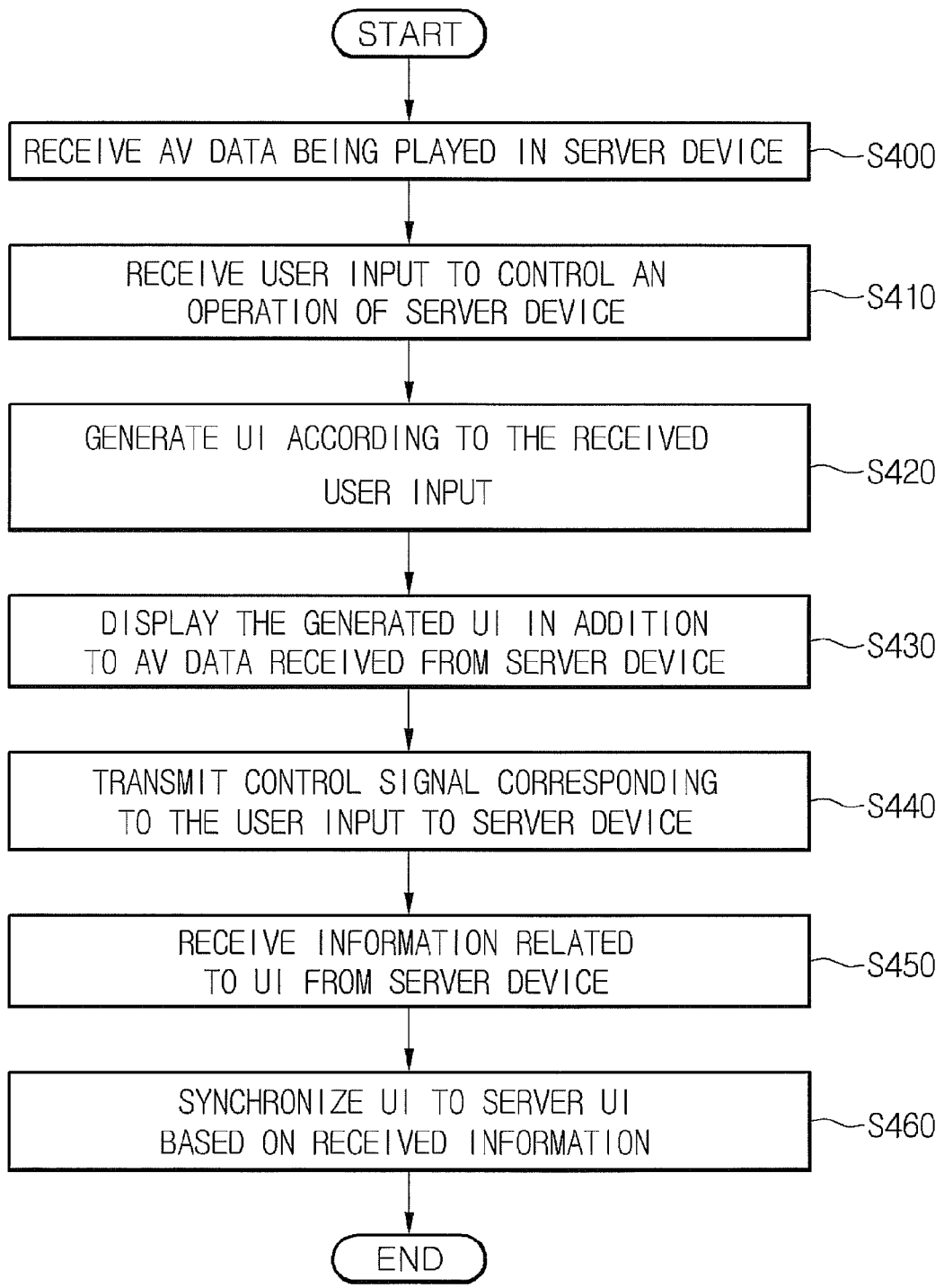

METHOD FOR DISPLAYING USER INTERFACE AND DISPLAY DEVICE THEREOF

CROSS-REFERENCE TO RELATED APPLICATION(S)

This application claims priority under to U.S. Provisional Application Ser. No. 61/563,602 filed in the United States on Nov. 24, 2011 and U.S. Provisional Application Ser. No. 61/563,607 filed in the United States on Nov. 25, 2011, whose entire disclosures are hereby incorporated by reference.

BACKGROUND

1. Field

A display device and a method for controlling the same are disclosed herein, and in particular to a method for displaying a user interface on the display device.

2. Background

Display devices and methods for displaying user interfaces on the display devices are known. However, they suffer from various disadvantages.

BRIEF DESCRIPTION OF THE DRAWINGS

The embodiments will be described in detail with reference to the following drawings in which like reference numerals refer to like elements wherein:

FIG. 1 is a block diagram illustrating a configuration of a content sharing system according to an embodiment as broadly described herein;

FIG. 2 is a block diagram illustrating a configuration of the server device of FIG. 1;

FIG. 5 is a flowchart of method for displaying a UI according to an embodiment as broadly described herein;

DETAILED DESCRIPTION

Figure 3:
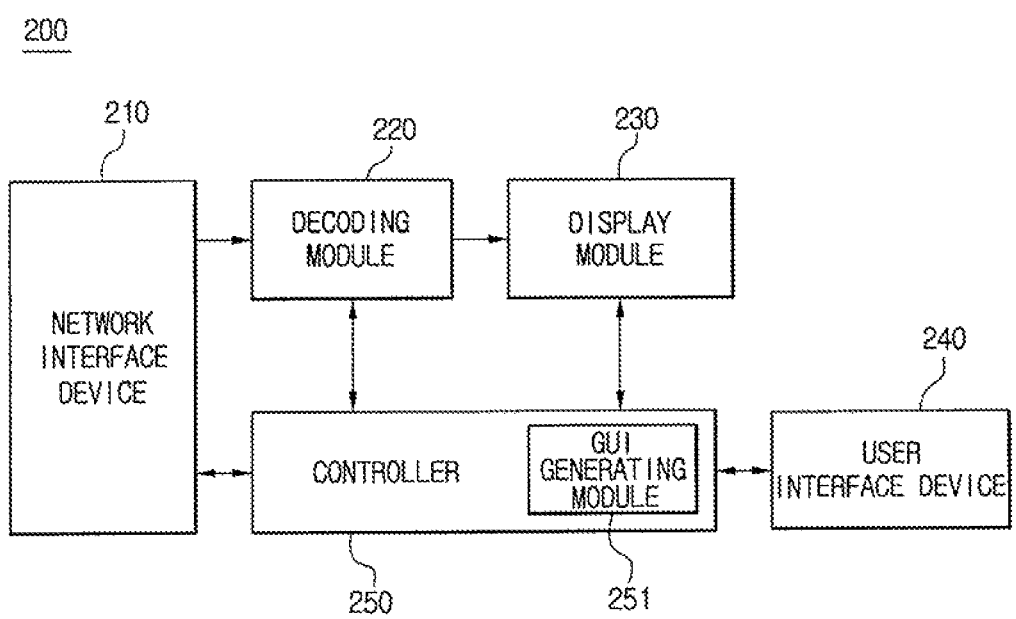
FIG. 3 is a block diagram illustrating a configuration of the client device of FIG. 1.

Hereinafter, a detailed description is provided of a display device and a method for displaying a UI on the same according to various embodiments with reference to the accompanying drawings. Embodiments of the present disclosure will be described with reference to the accompanying drawings and contents therein, however, it should be appreciated that embodiments are not limited thereto.

Various terms used in this specification are general terms selected in consideration of various functions of the present disclosure, but may vary according to the intentions or practices of those skilled in the art or the advent of new technology. Additionally, certain terms may have been arbitrarily selected, and in this case, their meanings are described herein. Accordingly, the terms used in this specification should be interpreted on the basis of substantial implications that the terms have and the contents across this specification not the simple names of the terms.

As broadly disclosed and embodied herein, a method for sharing content may transmit AV data being played on a server device for playback on a client device. Digital TVs and a wire/wireless network technology may provide access to various types of content services such as real-time broadcasting, Contents on Demand (COD), games, news, video communication, or the like. The content may be provided via an Internet network connected to each home in addition to typical electronic wave media.

An example of a content service provided via an Internet network is Internet Protocol TV (IPTV). The IPTV enables transmission of various information services, video content, broadcasts, or the like, via a high-speed Internet network to an end user. Additionally, an image display device such as a digital TV may be connected to an external image display device such as, for example, another TV, a smart phone, a PC, a tablet via a wire/wireless network, or the like, so that contents being played or stored in the image display device may be shared with the external image display device.

FIG. 1 is a block diagram illustrating a configuration of a content sharing system according to an embodiment as broadly described herein. The content sharing system may include a server device 100 and a client device 200. The server device 100 and the client device 200 may transmit/receive AV data over a wire/wireless network to share content. For example, as AV data being played on the server device 100 may be transmitted to the client device 200 in real time, a user may play the AV data received from the server device 100 at the client device 200. An operation on the server device 100 may be controlled from the client device using a user input device 300 connected to the client device 200. Moreover, an application for performing various functions such as transmission/reception, playback, control of the AV data, or the like may be installed in each of the server device 100 and the client device 200.

Additionally, the server device 100 and the client device 200 may be connected to each other to transmit/receive AV data through various communication standards such as Digital Living Network Alliance (DLNA), Wireless Lan (WiFi), Wireless HD (WIND), Wireless Home Digital Interface (WHDi), Blutooth, ZigBee, binary Code Division Multiple Access (CDMA), Digital Interactive Interface for Video & Audio (DiiVA) or another appropriate communication standard based on the desired implementation. The server device 100 and the client device 200 may be connected to a media server via a wire/wireless network such as the Internet, and may transmit/receive contents data through the media server for sharing content. Moreover, the server device 100 and the client device 200 may be a digital TV (for example, a network TV, an HBBTV, or a smart TV) or another appropriate type of device (for example, a PC, a notebook computer, a mobile communication terminal such as a smart phone, or a tablet PC).

An 'N-screen' service is a service that allows various devices such as a TV, a PC, a tablet PC, a smart phone, or another appropriate type of device to continuously access a particular content through the content sharing system described with reference to FIG. 1. For example, a user may begin watching a broadcast or movie using a TV, then resume watching the same content using another device, such as a smart phone or tablet PC. Moreover, additional information associated with the content may be accessed and viewed while watching the content on the TV, phone or tablet PC.

A contents file may be shared (e.g., file share) or a screen of an image display device may be shared (e.g., screen share) between the server device 100 and the client device 200 through the above 'N-screen' service. For this, the server device 100 such as a PC may transmit contents received from an external device or stored therein to the client device 200, such as a TV, at the user's request through the above-mentioned communication method.

Additionally, purchased contents may be stored in the media server and may be downloaded from the media server via internet, so that the user may play the contents as desired at a chosen image display device among the server device 100 and the client device 200.

The server device 100 and the client device 200 of FIG. 1 may be wire/wirelessly connected to at least one content source and may share contents provided from the content source. For example, the content source may be a device equipped in or connected to an image display device, a Network-Attached Storage (NAS), a Digital Living Network Alliance (DLNA) server, a media server, or the like, but the present disclosure is not limited thereto.

FIG. 2 is a block diagram illustrating a configuration of the server device of FIG. 1. The server device 100 may include a display module 110, a capture module 120, an encoding module 130, a network interface device 140, and a control unit 150 (controller). The display module 110 displays an image of AV data received from an external or stored therein according to the control of the controller 150. The audio from the AV data may be played through a sound output device.

The capture module 120 may capture an image and sound being played on the server device 100 through the display module 110 and the sound output device in order to generate AV data for transmission to the client device 200. Moreover, the encoding module 130 may encode the captured image and sound to output compressed AV data, and then, the compressed AV data outputted from the encoding module 130 may be transmitted to the client device 200 through the network interface device 140.

The network interface device 140 may provide an interface for connecting the server device 100 with a wire/wireless network including an internet network. For example, the network interface device 140 may include an Ethernet terminal for an access to a wire network, and may access a wireless network for communication with the client device 200 through WiFi, WiHD, WHDi, Blutooth, ZigBee, binary CDMA, DiiVA, Wibro, Wimax, and HSDPA communication standards.

Moreover, the network interface device 140 may receive a control signal transmitted from the client device 200. The control signal may be a user input signal to control an operation of the server device 100 through the user input device 300 connected to the client device 200. The user input device 300 may be a keyboard, a mouse, a joystick, a motion remote controller, or another appropriate type of user input interface.

For this, the network interface device 140 may include an access formation module for forming a network access for communication with the client device 200, a transmission packetizing module for packetizing the AV data outputted from the encoding module 130 according to the accessed network, and an input device signal receiving module for receiving a control signal transmitted from the client device 200.

The controller 150 may demultiplex a stream inputted from the network interface device 140, an additional tuner, a demodulator, or an external device interface device, and then, may process the demultiplexed signals in order to generate and output a signal for image or sound output.

An image signal processed in the controller 150 may be inputted to the display module 110, and then, is displayed as an image corresponding to the corresponding image signal, and a sound signal processed in the controller 150 is outputted to a sound output device. For this, although not shown in FIG. 2, the controller 150 may include a demultiplexer and an image processing unit.

Additionally, the controller 150 may further include an input signal reflecting module for performing an operation according to a control signal, which is received from a client device or a user input device directly connected to the server device 100. For example, a GUI generating unit 151 may generate a graphic user interface according to the received control signal in order to display a User Interface (UI) corresponding to the user input on the screen of the display module 110. For example, a user input inputted through the user input device 300 may be a mouse input for moving a pointer displayed on a screen, a keyboard input for displaying a letter on a screen, or another appropriate type of input.

According to an embodiment, the server device 100 as shown in FIG. 2 may receive a control signal corresponding to a user input for controlling an operation of the server device 100 from the client device 200. The server device 100 may generate a UI according to the received user input to be displayed on a display screen in addition to an image of AV data. The server device 100 may transmit information related to the UI displayed on the screen in addition to the UI to the client device 200 at a predetermined time or each time a specific event occurs.

FIG. 3 is a block diagram illustrating a configuration of the client device of FIG. 1. The client device 200 may include a network interface device 210, a decoding module 220, a display module 230, a user interface 240, and a control unit 250 (controller).

The network interface device 210 may provide an interface for connecting the client device 200 to a wire/wireless network including an internet network. The network interface device 210 may also receive AV data from the server device 100 via the wire/wireless network.

The decoding module 220 may decode the AV data received from the server device 100. The decoded AV data may be reproduced on the display module 210 and a sound output device. For this, the network interface device 210 may include an access formation module for forming a network access for communication with the server device 100, and a transmission packet parser module for parsing the packetized AV data received from the server device 100.

Moreover, the user interface device 240 may receive a user input received from the user input device 300, and the controller 250 may transmit a control signal corresponding to the received user input to the server device 100 through the network interface device 210. The user input may be used to control an operation of the server device 100 from the user input device 300.

The controller 250 may demultiplex a stream inputted from the server device 100 through the network interface device 210, and may process the demultiplexed signals in order to generate and output the processed signals for outputting video and sound. An image signal processed in the controller 210 may be inputted to the display module 230, and then, may be displayed as an image corresponding to a corresponding image signal. Moreover, a sound signal processed in the controller 250 may be outputted to a sound output device. For this, although not shown in FIG. 3, the controller 250 may include a demultiplexer and an image processing module.

Furthermore, as mentioned above, the client device 200 may deliver a control signal corresponding to a user input received from the user input device 300 to the server device 100, and the server device 100 may operate according to the delivered control signal. Then, a predetermined time delay may occur, until an image being played in the server device 100 is transmitted to the client device 200 and is reflected on a screen of the client device 200 after the operational result of the server device 100 is reflected on the screen of the display module 110.

For example, a delay may exist from a point when the user inputs a command at the client device 200 (e.g., at the user input device 300) to when the command is executed and reflected on the display screen of the client device 200. Various types of delays may contribute to the delay between the time a command is input at the client device 200 to when a corresponding update is displayed on the client display screen. A network transmission delay $\Delta t_1$ may occur on the network during transmission of the AV data from the server device 100 to the client device 200. An internal streaming process routine delay $\Delta t_2$ may occur during processing of the transmitted AV data in the network interface device 210 of the client device 200. An internal decoding routine delay $\Delta t_3$ may occur during decoding of the received AV data in the decoding module 220 of the client device 200. Other types of delays may also be found based on the configuration of the connected devices.

Figure 4A:
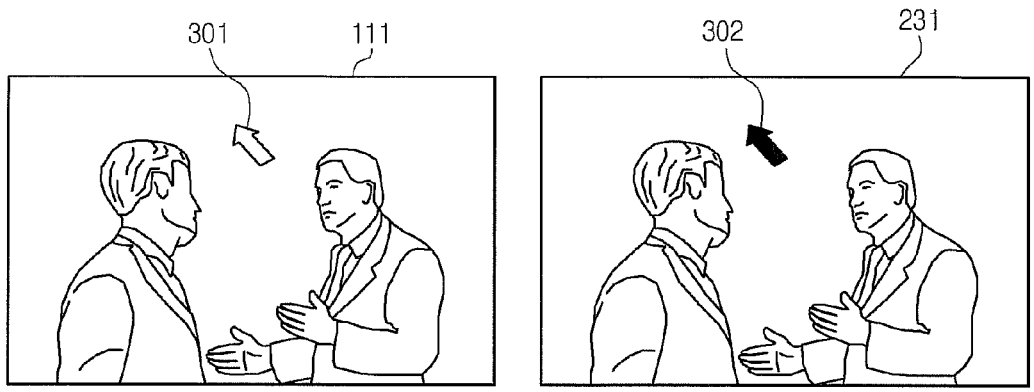
FIGS. 4A to 4C illustrate a method for displaying a user interface (UI) according to a user input in a server device and a client device as broadly described herein.
Figure 4B:
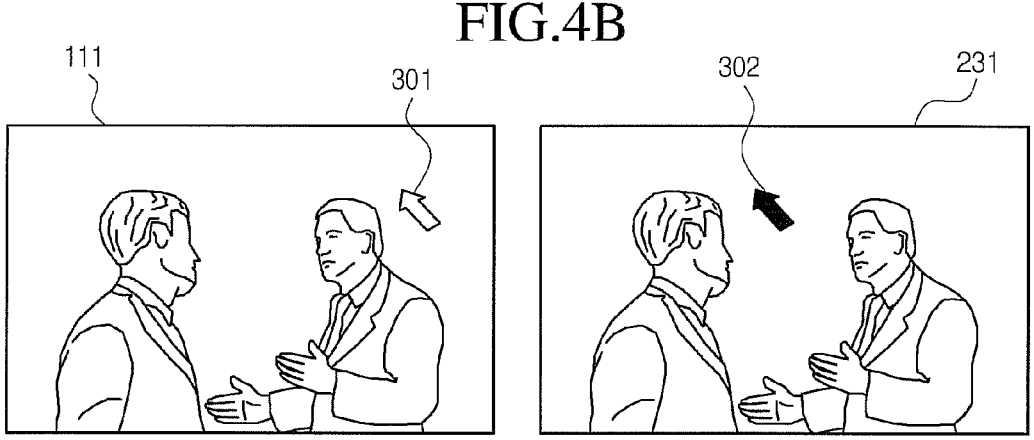

Referring to FIG. 4A, pointers 301 and 302 may be displayed on the same relative positions of the screen 111 of the server device 100 and the screen 231 of the client device 200. Referring to FIG. 4B, when a user, for example, moves a mouse connected to the client device 200 in order to move the pointer on the screen, the pointer 301 on the screen 111 of the server device 100 may move immediately according to a control signal received from the client device 200, but the pointer 302 on the screen 231 of the client device 200 may not move for a predetermined time due to the above-mentioned delay.

Then, after the predetermined time, for example, the sum of the delay times ($\Delta t_1 + \Delta t_2 + \Delta t_3$), the pointer 302 on the screen 231 of the client device 200 may move to correspond to the position of the pointer 301 on the screen 111 of the server device 100. The sum of the delay times may be approximately 0.26 sec. The delay in updating the UI of the client device 200 in response to user inputs may make controlling the devices difficult.

According to an embodiment, the client device 200 as shown in FIG. 3 may receive AV data being played in the server device 100, receive a user input for controlling an operation of the server device 100, generate a UI according to the received user input to display the UI in addition to an image of the AV data received from the server device 100 on the screen of the client device 200, and transmit a control signal corresponding to the user input to the server device 100.

For this, the controller 250 may further include an input signal reflecting module for performing an operation according to the input received from the user input device 300. For example, a GUI generating module 251 may generate a graphic user interface according to the received control signal in order to display a UI corresponding to the user input on the screen of the client device 200 through the display module 230.

FIG. 5 is a flowchart of a method for displaying a UI according to an embodiment as broadly described herein. The method of displaying a UI of FIG. 5 will be described with reference to the block diagrams of FIGS. 1 to 3.

The network interface device 210 of the client device 200 may receive AV data being played in the server device 100, in step S400. An input for controlling an operation of the server device 100 may be received at the user input device 300 while the received AV data is being displayed on the client device 200, and an input signal may be transmitted to the user interface device 240 from the user input device 300, in step S410.

In this case, the GUI generating module 251 of the client device 200 may generate a UI based on the received user input, in step S420, and may display the UI in addition to an image of the AV data received from the server device 100 on the client display module 230, in step S430. For example, if the user input device 300 is a mouse, the mouse may detect a motion input by the user to move a pointer displayed on each of the screens of the server device 100 and the client device 200, and may transmit an input signal corresponding to the motion to the client device 200.

At this point, the GUI generating module 251 of the client device 200 may generate a pointer that is moved according to the received input signal, and the controller 250 may control the display module 230 in order to allow the moved pointer on the screen to be immediately displayed on the screen of the client device 200. The pointer may be displayed in addition to an image of the AV data received from the server device 100.

Figure 4C:
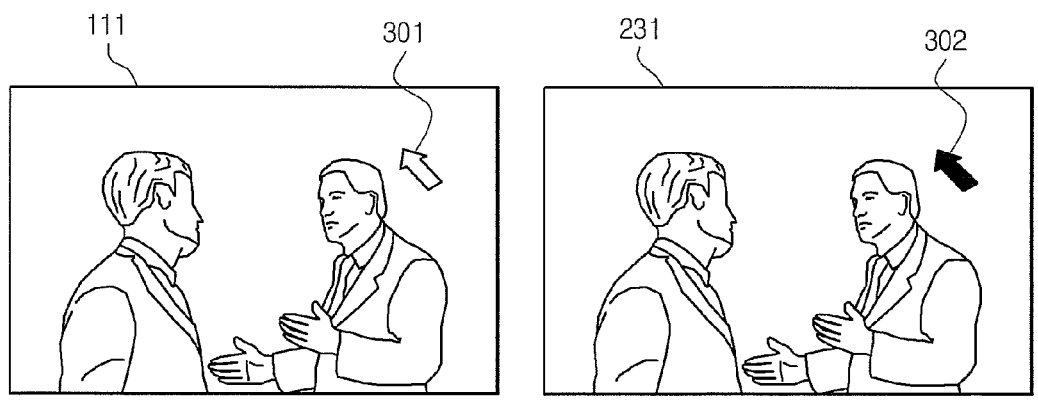

Accordingly, a control operation through the user input device 300 may be immediately reflected on the screen of the client device 200, and thus, the delay described with reference to FIG. 4 may be avoided.

The network interface device 210 of the client device 200 may transmit a control signal to the server device 100, in step S440. The control signal transmitted to the server device 100 may correspond to the user input received through the user interface device 240 at the client device 200. The server device 100 may display a UI based on the control signal transmitted from the client device 200.

However, because the client device 200 autonomously generates and displays the UI using the GUI generating module 251 without using display information for the UI among data received from the server device 100, the UI displayed on the client device 200 may be different than the UI displayed on the server device 100.

In certain embodiments, the client device 200 may adjust a UI displayed on the screen by using UI information received from the server device 100 at a predetermined time or time intervals, or based on occurrences of specific events. That is, as mentioned above, since the UI displayed on the screen of the client device 200 is autonomously generated in the client device 200, it may be different from the UI displayed on the screen of the server device 100 in terms of a display position, form, size, or the like.

Accordingly, the server device 100 may transmit information related to the UI displayed on the screen of the server device 100 to the client device 200, in step S450. The server device 100 may transmit the information at predetermined time intervals (for example, 5 sec periods) or each time a specific event occurs (for example, at the end of mouse click, or character input). The client device 200 may receive the UI information through the network interface device 210. The UI information may be transmitted from the server device 100 to the client device 200 separately from the AV data. The UI information from the server device 100 may be used to adjust the display position, form, size, or the like of the client side UI displayed on the client display screen, in step S460.

That is, the client device 200 may autonomously generate a UI according to the user input received from the user input device 300 and may display the UI, and may then receive information on the UI displayed on the screen of the server device 100 at a predetermined time intervals or each time a prescribed event occurs in order to synchronize the client side UI with that of the server side UI based on the received information.

For example, the UI information received from the server device 100 may be coordinate information for the display position of the server side UI. In this case, the controller 250 of the client device 200 may change a display position of the client side UI by using the coordinate information received from the server device 100.

Figure 6A:
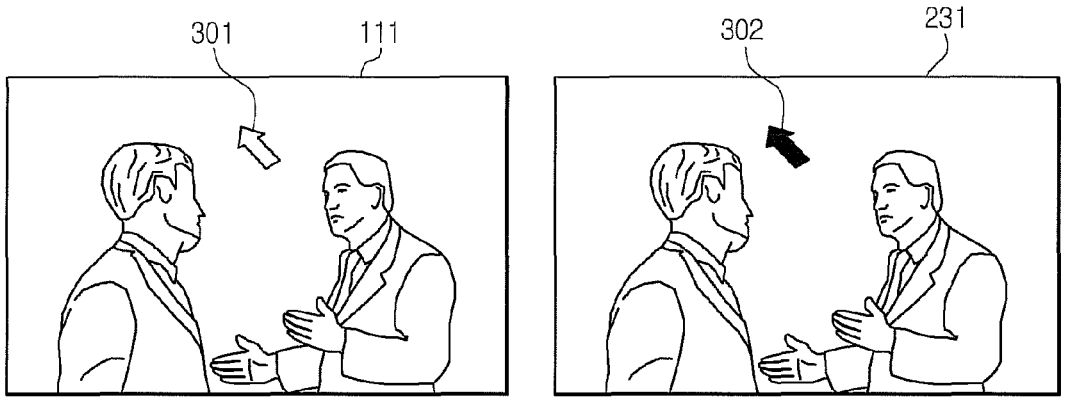
FIGS. 6A to 6C are views of display screens that illustrate a method for displaying a pointer according to a mouse input on the display of a server device and a client device according to an embodiment as broadly described herein.
Figure 6B:
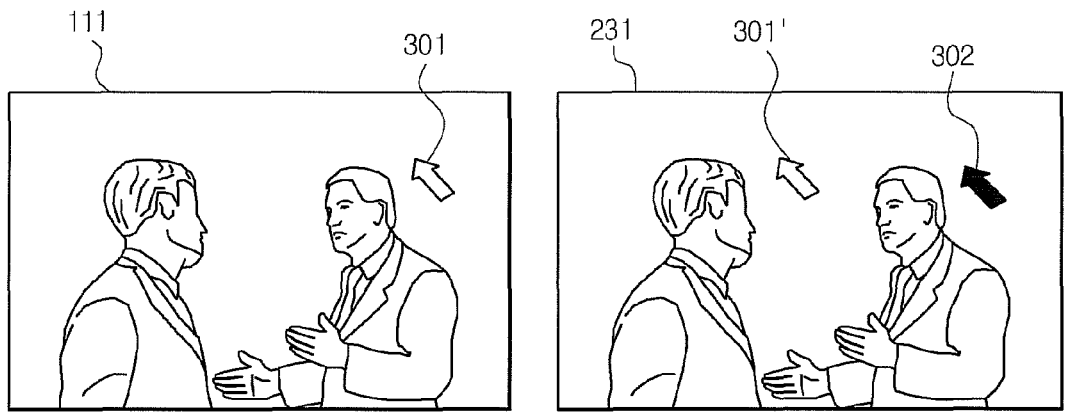
Figure 6C:
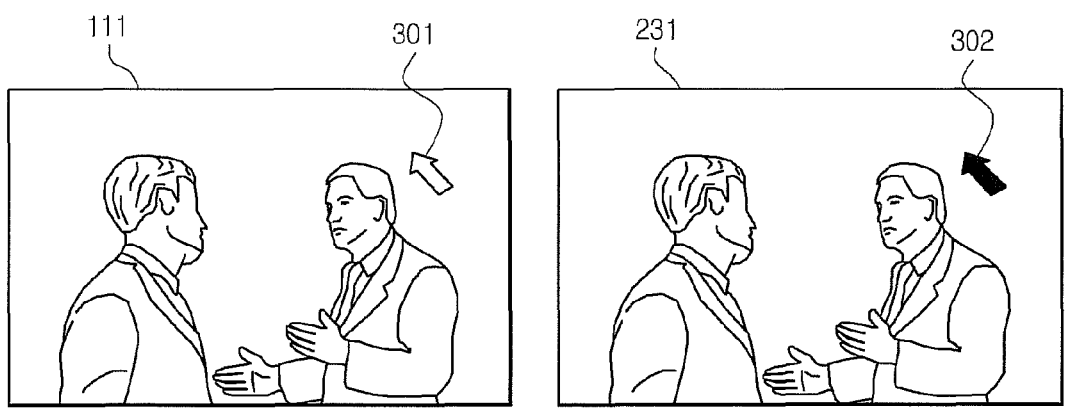

FIGS. 6A to 6C are views of display screens that illustrate a method for displaying a pointer according to a mouse input of a user on the screens of the server device 100 and the client device 200 according to an embodiment as broadly described herein.

Referring to FIG. 6A, pointers 301 and 302 may be displayed at corresponding positions at the screen 111 of the server device 100 and the screen 231 of the client device 200. The corresponding positions may be based on the same coordinates for each of the devices.

Referring to FIG. 6B, when a user moves a mouse connected to the client device 200 in order to move a pointer displayed on the screen, the controller 250 of the client device 200 may autonomously change the client side pointer, e.g., the UI displayed on the screen 231, according to the mouse input. In this case, as illustrated in FIG. 6B, the position of the pointer 302 displayed on the screen 231 of the client device 200 may immediately be moved in correspondence to the mouse input of a user. Moreover, a control signal associated with the user input is transmitted to the server device 100 and pointer 301 is moved according to the user input at the server device 100, as illustrated in FIG. 6B.

However, another pointer 301' in the image of the AV data received from the server device 100 may be displayed. Pointer 301' corresponds to the pointer 301 of FIG. 6A, prior to the position of pointer 301 being updated at the server device 100. This pointer 301' may be temporarily displayed on the screen 231 of the client device 200 for a short period of time. That is, on the client device 200, the pointer 301' corresponds to the pointer 301 on the server device 100 and pointer 302 is separately generated by the client device 200 based on user input.

Then, as illustrated in FIG. 6C, after a predetermined amount of time the position of pointer 302 displayed on the screen 231 of the client device 200 may be synchronized with the position of the pointer 301 displayed on the screen 111 of the server device 100. In other words, pointer 301' is no longer displayed on the client device 100 and the position of pointer 302 is synchronized with the actual position of pointer 301 displayed at the server device 100.

In one embodiment, the pointer 301' is not displayed on the client side display screen. For example, referring to FIG. 6B, information associated with the server side UI from the server device 100 may be disregarded when the position of pointer 302 is updated on the client device 200, and hence, pointer 301' may be not displayed. The information on the server side UI from the server device 100 may be sent separately from the AV data. When pointer 302 is generated on the client device 200, pointer 301' is no longer displayed on the client device 200. Thereafter, once updated information regarding the server side UI (e.g., position of pointer 301) is received at the client device 200, this updated information may be used to synchronize the position of the client side pointer 302 to match the position of pointer 301 on the server device 100. In this way, display of multiple instances of the pointer may be prevented on the client device 200 and any flickering or shadowing effect of the cursor may be avoided.

Although embodiments of the method for displaying UI has been described with reference to the user input device 300 being a mouse, the present disclosure is not limited thereto, and other appropriate types of input devices may also be applicable.

Figure 7A:
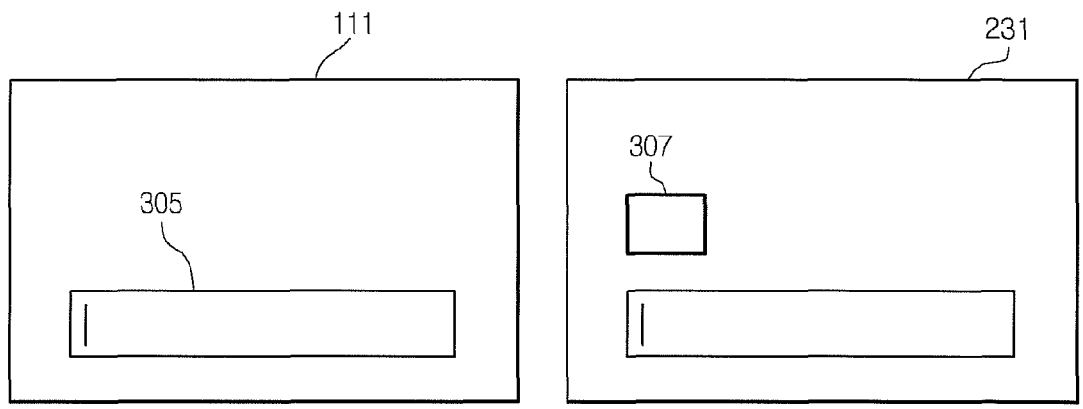
FIGS. 7A to 7C are views of display screens that illustrate a method for displaying a character string according to a keyboard input on the display of a server device and a client device according to an embodiment as broadly described herein.
Figure 7B:
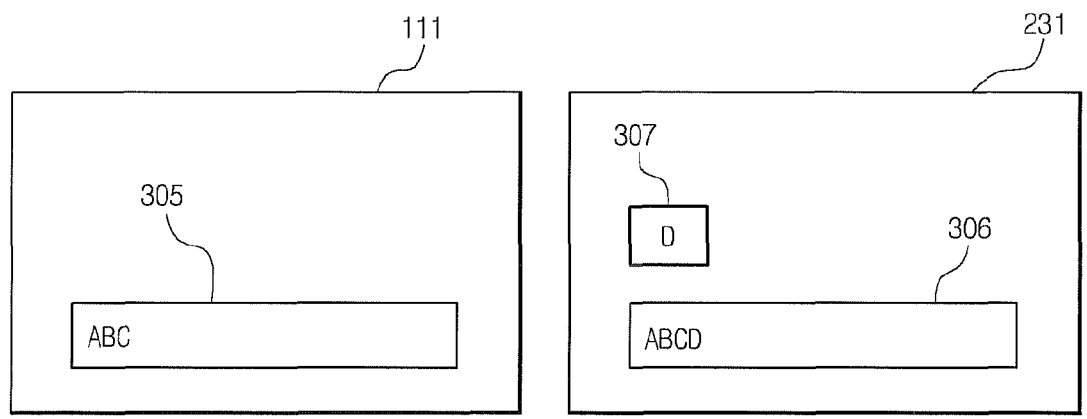
Figure 7C:
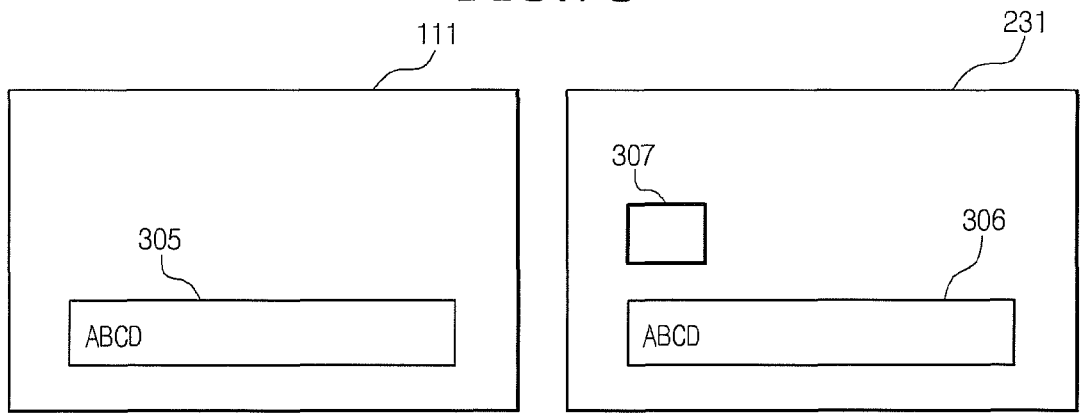

FIGS. 7A to 7C are views of display screens that illustrate a method for displaying a character string according to a keyboard input on the display screens of a server device and a client device according to an embodiment.

Referring to FIG. 7A, character input windows 305, 306, and 307 (e.g., text fields) may be used to input characters and numbers through, for example, a keyboard and displayed on the screen 111 of the server device 100 and the screen 231 of the client device 200.

Referring to FIG. 7B, when a character string, for example, "ABCD," is input at the client device 200 using the keyboard, the controller 250 of the client device 200 may control the display module 130 to immediately display the inputted character string in the input fields 306 and 307 of the client display screen 231 in response to the keyboard input. That is, the controller 250 may display the input character string on the client device 100 without waiting for UI information from the server device 100.

In this case, the character string "ABCD" corresponding to the keyboard input may be displayed immediately in the character input windows 306 and 307 of the client display screen 231. However, on the server device 100, only a portion of the inputted character string (e.g., "ABC"), may be displayed on the character input window 305 of the server side display screen 111.

This may be caused by a delay in communicating the input signal from the client device 200 to the server device 100. For example, the client device 200 may immediately display the character string inputted through the keyboard on the screen 231, and hence may not experience a noticeable delay in displaying the character string. However, the server device 100 may only display the character string on the server side display screen 111 only after receiving the information associated with the inputted character string from the client device 200.

As illustrated in FIG. 7C, after a predetermined amount of time, the entire character string (e.g., "ABCD") may be displayed on both the server display screen 111 and the client display screen 231. Accordingly, a delay in displaying user inputs at the client device may be eliminated or reduced.

According to another embodiment, whether to display a UI on the client device 200 as well as the configuration of the UIs displayed on the client and/or the server devices such as, for example, format, size, or another appropriate characteristic of the UI, may set by a user or stored in memory as default values.

According to another embodiment, a pointer which is used when an image is captured in the server device 100 such as a PC may disappear when certain applications are implemented. For example, a cursor may disappear during image capture during implementation of a game. In this case, the server device 100 may generate the disappeared cursor and may combine the cursor with the captured image for transmission to the client device 200. Alternatively, the client device 200 may generate and display the cursor based on coordinate information received from the server device 100.

As broadly described and embodied herein, a client device may autonomously generate a user interface and display the user interface on a display screen of the client device in order to reduce a time delay between a server device and the client device. For example, in a display sharing environment, a client device may receive AV data from a server device to mirror the image being displayed on the server device. In this environment, when a user input is received at the client device for controlling the server device, the client device and the server device may separately generate UIs based on the inputs in order to reduce or eliminate delays in displaying the UI on the client in response to the inputs. Thereafter, the UI of the client device and the server device may be synchronized. In this way, the user experience and convenience of using the UI in a shared AV environment may be improved.

In one embodiment, a method for displaying a graphical user interface on a server device and a client device for controlling the server device may include: receiving AV data being played in the server device at the client device; receiving a command at the client device to control the server device; generating a first graphical user interface in response to the received command for display on the client device together with the AV data received from the server device; transmitting a control signal corresponding to the command to the server device; and receiving information related to a second graphical user interface displayed on the server device in response to the command, wherein the first graphical user interface is displayed on the client device before the information related to the second graphical user interface displayed on the server device is received.

The server device may display the second graphical user interface based on the control signal received from the client device. The method may also include synchronizing the first graphical user interface displayed on the client device with the second graphical user interface displayed on the server device based on the received information. Synchronizing the first graphical user interface may include adjusting at least one of a position, size, or format of the first graphical user interface displayed at the client device to correspond to the second graphical user interface displayed at the server device.

The receiving the information related to the second graphical user interface may include receiving the information at a predetermined time intervals or based on a prescribed event. The information received related to the second graphical user interface may be coordinate information corresponding to the displayed position of the second graphical user interface on the server device. Moreover, the synchronizing the first graphical user interface may include changing a position of the first graphical user interface at the client device based on the coordinate information received from the server device.

The received command may correspond to an input at a mouse or a keyboard at the client device. At least a portion of the input received from the keyboard may be displayed at the client device a prescribed amount of time before being displayed at the server device. The generating the first graphical user interface for display on the client device may include determining at least one of whether to display a user interface, a format, or a size based on a preference setting stored on the client device. Moreover, a computer readable recoding medium may be provided that records a program for executing the method in a computer.

In one embodiment, a client device for receiving AV data from a server device for playback, may include: a network interface for receiving AV data from the server device, the AV data corresponding to content being played on the server device; a user interface device for receiving an input to control an operation of the server device; a GUI generating module that generates a user interface on the client device based on the received input; and a display for displaying the AV data received from the server device in addition to the generated user interface, wherein the network interface device transmits a control signal corresponding to the input to the server device, and receives information related to a user interface displayed on the server device at predetermined intervals of time or in response to prescribed events.

The user interface displayed on the client device may be displayed at least a prescribed amount of time before the information related to the user interface of the server device is received. The user interface at the server device may be displayed in response to the control signal transmitted to the server device. Moreover, a controller may be provided for synchronizing the user interface displayed on the display with the user interface displayed at the server device based on the information related to the user interface received from the server device. The controller may synchronize at least one of a position, size, or format of the user interface displayed at the client device to the user interface displayed at the server device.

The information related to the user interface received from the server device may include coordinate information for the user interface displayed at the server device. The user interface may be at least one of a mouse or a keyboard, and the input is a mouse input for moving a pointer displayed on the display or a keyboard input for displaying a character on the display. At least a portion of the input received from the keyboard may be displayed at the client device a prescribed amount of time before being displayed at the server device.

In one embodiment, a server device that transmits AV data to a client device, may include: a network interface device for receiving a control signal corresponding to an input at the client device to control an operation of the server device; a GUI generating module for generating a user interface on the server device based on the received input; and a display for displaying the AV data together with the generated user interface, wherein the network interface device transmits information related to the user interface displayed on the display to the client device at predetermined intervals of time or in response to prescribed event.

In one embodiment, a method for displaying a User Interface (UI) according to a user input in a client device that receives AV data from a server device and plays the received AV data, may include: receiving AV data being played in the server device; receiving a user input for controlling an operation of the server device; generating a UI according to the received user input to display on a screen an image of the AV data received from the server device in addition to the generated UI; and transmitting a control signal corresponding to the user input to the server device. A first pointer according to the UI displayed on the screen of the server device and a second pointer according to the UI generated in the client device are simultaneously displayed on the screens for a predetermined time after a mouse input.

In another embodiment, a method for displaying a UI according to a user input in a server device that transmits AV data to a client device, may include: receiving a control signal corresponding to a user input for controlling an operation of the server device, from the client device; generating a UI according to the received user input to display on a screen an image of the AV data in addition to the generated UI; and transmitting information on the UI displayed on the screen to the client device at a predetermined time or each time a specific event occurs. In further another embodiment, a computer readable recoding medium is provided that records a program for executing the method in a computer.

In still further another embodiment, a client device for receiving AV data from a server device and playing the received AV data, may include: a network interface device for receiving AV data being played in the server device; a user interface unit for receiving a user input to control an operation of the server device; a GUI generating unit for generating a UI according to the received user input; and a display module for displaying on a screen an image of the AV data received from the server device in addition to the generated UI, wherein the network interface device transmits a control signal corresponding to the user input to the server device, and receives information on the UI displayed on the screen of the server device at a predetermined time or each time a specific event occurs.

The method for displaying a UI according to embodiments of the present disclosure may be programmed to be executed in a computer and may be stored on a computer readable recording medium. Examples of the computer readable recording medium include read-only memory (ROM), random-access memory (RAM), CD-ROMs, magnetic tapes, floppy disks, and optical data storage devices.

The computer readable recording medium can also be distributed over network coupled computer systems so that the computer readable code is stored and executed in a distributed fashion. Also, functional programs, codes, and code segments for accomplishing the present disclosure can be easily construed by programmers skilled in the art to which the present disclosure pertains.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for displaying a graphical user interface on a server device and a client device for controlling the server device, comprising:
    receiving AV data being played in the server device at the client device;
    displaying the received AV data on the client device;
    receiving by the client device, a command to control the server device;
    generating a first graphical user interface in response to the received command for display on the client device;
    immediately displaying the generated first graphical user interface, together with the received AV data on the client device, without waiting for UI information from the server device;
    transmitting a control signal corresponding to the command to the server device;
    receiving information, from the server device, related to updated AV data generated in response to executing the command at the server device;
    receiving information, from the server device, related to a second graphical user interface displayed on the server device generated in response to executing the command at the server device;
    wherein the information related to the second graphical user interface is transmitted separately from the updated AV data;
    synchronizing the first graphical user interface displayed on the client device with the second graphical user interface displayed on the server device based on the received information in order for the client device to display the same as that on the server device by adjusting at least one of the display position, form, or size of the client user interface, and
    wherein the first graphical user interface is displayed on the client device before the information related to the second graphical user interface displayed on the server device is received.

2. The method according to claim 1, wherein the server device displays the second graphical user interface based on the control signal received from the client device.

3. The method of claim 1, wherein the receiving the information related to the second graphical user interface includes receiving the information at a predetermined time intervals or based on a prescribed event.

4. The method according to claim 1, wherein the information received related to the second graphical user interface is coordinate information corresponding to the displayed position of the second graphical user interface on the server device.

5. The method of claim 4, wherein the synchronizing the first graphical user interface includes changing a position of the first graphical user interface at the client device based on the coordinate information received from the server device.

6. The method of claim 5, wherein at least a portion of the input received from the keyboard is displayed at the client device a prescribed amount of time before being displayed at the server device.

7. The method of claim 1, wherein the received command corresponds to an input at a mouse or a keyboard at the client device.

8. The method of claim 1, wherein the generating the first graphical user interface for display on the client device includes determining at least one of whether to display a user interface, a format, or a size based on a preference setting stored on the client device.

9. A non-transitory computer readable recoding medium that records a program for executing the method of claim 1 in a computer.

10. A client device for receiving AV data from a server device for playback, comprising:
    a network interface device for receiving AV data from the server device, the AV data corresponding to content being played on the server device;

a user interface device for receiving an input to control an operation of the server device;

a display module for displaying the AV data received from the server device; and a controller configured to:

generate a first user interface on the display module based on the received input, display the generated first user interface, immediately, together with the received AV data on the display module without waiting for UI information from the server device and, generate a control signal corresponding to the input, wherein the network interface device transmits the control signal corresponding to the input to the server device, receives information, from the server device, related to updated AV data generated in response to executing the command at the server device, receives information, from the server device, related to a second graphical user interface generated in response to executing the command at the server device, wherein the information related to the second graphical user interface is transmitted separately from the updated AV data, wherein the controller is further configured to synchronize the first user interface displayed on the display module with the second user interface displayed at the server device based on the received information in order for the client device to display the same as that on the server device by adjusting at least one of the display position, form, or size of the client user interface.

11. The client device of claim 10, wherein the controller displays the first user interface on the display module at least a prescribed amount of time before the information related to the user interface of the server device is received.

12. The client device of claim 10, wherein the second user interface at the server device is displayed in response to the control signal transmitted to the server device.

13. The client device of claim 10, wherein the information related to the second user interface received from the server device includes coordinate information for the second user interface displayed at the server device.

14. The client device of claim 10, wherein the user interface device includes at least one of a mouse or a keyboard, and the input is a mouse input for moving a pointer displayed on the display module or a keyboard input for displaying a character on the display.

15. The client device of claim 14, wherein at least a portion of the input received from the keyboard is displayed on the display module a prescribed amount of time before being displayed at the server device.

* * * * *